(12) United States Patent
Takeichi et al.

(10) Patent No.: US 10,717,441 B2
(45) Date of Patent: Jul. 21, 2020

(54) VEHICLE CONTROL SYSTEM

(71) Applicant: TOYOTA JIDOSHA KABUSHIKI KAISHA, Toyota-shi, Aichi (JP)

(72) Inventors: Akira Takeichi, Susono (JP); Ayumu Sagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 82 days.

(21) Appl. No.: 16/217,108

(22) Filed: Dec. 12, 2018

(65) Prior Publication Data

US 2019/0184999 A1    Jun. 20, 2019

(30) Foreign Application Priority Data

Dec. 20, 2017   (JP) .................................. 2017-244286

(51) Int. Cl.
*B60W 30/188*   (2012.01)
*B60W 20/19*    (2016.01)
(Continued)

(52) U.S. Cl.
CPC .......... *B60W 30/188* (2013.01); *B60W 10/06* (2013.01); *B60W 10/10* (2013.01); *B60W 20/19* (2016.01); *B60W 20/40* (2013.01); *B60W 50/0097* (2013.01); *F02B 33/40* (2013.01); *F02B 37/18* (2013.01); *F02B 39/12* (2013.01); *F16H 61/0213* (2013.01); *B60W 2540/10* (2013.01); *B60W 2540/106* (2013.01); *B60W 2710/0638* (2013.01);
(Continued)

(58) Field of Classification Search
CPC ............. B60W 20/19; B60W 2540/10; B60W 2540/106; B60W 2720/106
See application file for complete search history.

(56) References Cited

U.S. PATENT DOCUMENTS 4,727,771 A *  3/1988  Niwa ............... G16H 61/66254
                                                       477/48
4,976,170 A * 12/1990  Hayashi .................. F16H 61/66
                                                       477/43
(Continued)

FOREIGN PATENT DOCUMENTS

JP      H06-117528 A    4/1994
JP      H06-219188 A    8/1994
(Continued)

*Primary Examiner* — David R Morris
(74) *Attorney, Agent, or Firm* — Oliff PLC (57) ABSTRACT

A vehicle control system to accurately control a vehicle by estimating a position of an accelerator pedal. In a first phase of an operation of the accelerator pedal in which a depression of the accelerator pedal increases, a first predicted value of a position of the accelerator pedal is calculated by a first calculation procedure based on the position of the accelerator in the first phase. In a second phase in which the change amount of the position of the accelerator plateaus, a second predicted value of the position of the accelerator pedal is calculated by a second calculation procedure based on the position of the accelerator in the second phase. In a third phase in which the change amount of the position of the accelerator decreases, the second predicted value is employed as the predicted value of the position of the accelerator pedal.

12 Claims, 9 Drawing Sheets

(51) Int. Cl.
  *B60W 50/00*  (2006.01)
  *F02B 39/12*  (2006.01)
  *B60W 10/06*  (2006.01)
  *B60W 10/10*  (2012.01)
  *B60W 20/40*  (2016.01)
  *F16H 61/02*  (2006.01)
  *F02B 37/18*  (2006.01)
  *F02B 33/40*  (2006.01)

(52) U.S. Cl.
  CPC ............ *B60W 2710/1005* (2013.01); *B60W 2720/106* (2013.01); *B60Y 2200/92* (2013.01)

(56) References Cited

U.S. PATENT DOCUMENTS

| | | |
|---|---|---|
| 5,411,449 A | 5/1995 | Takahashi et al. |
| 6,442,467 B1 * | 8/2002 | Schuler ............... F16H 59/141 |
| | | 477/133 |
| 6,830,532 B1 * | 12/2004 | Gebby .................. B60K 5/08 |
| | | 477/107 |
| 8,133,154 B2 * | 3/2012 | Tao ..................... F16H 61/0213 |
| | | 477/120 |
| 8,617,029 B2 * | 12/2013 | Kabe .................. F16H 61/6648 |
| | | 477/37 |
| 2009/0233765 A1 * | 9/2009 | Tao ..................... F16H 61/0213 |
| | | 477/127 |

FOREIGN PATENT DOCUMENTS

| | | |
|---|---|---|
| JP | H06-300125 A | 10/1994 |
| JP | 2014-190498 A | 10/2014 |
| JP | 2016-178794 A | 10/2016 |

\* cited by examiner

VEHICLE CONTROL SYSTEM

CROSS REFERENCE TO RELATED APPLICATIONS

The present application claims the benefit of priority to Japanese Patent Application No. 2017-244286 filed on Dec. 20, 2017 with the Japanese Patent Office, the entire contents of which are incorporated herein by reference in its entirety.

BACKGROUND

Field of the Disclosure

Embodiments of the disclosure relate to the art of a control system for a vehicle accelerated by operating an accelerator, and more specifically, to a control system for controlling a vehicle based on a predicted change amount of a position of an accelerator pedal.

Discussion of the Related Art

JP-A-2014-190498 describes a control device for an automatic transmission configured to prevent execution of an unnecessary kickdown shift while improving a response of kickdown shift. According to the teachings of JP-A-2014-190498, a variable speed estimation value is calculated based on a synthesized vectorized value of change amounts of an accelerator opening and a vehicle speed. When the calculated variable speed estimation value exceeds a downshift line and the accelerator opening exceeds an up-shift line, a downshift is caused while setting a target gear stage to a stage at least one stage lower than the current gear stage. If the accelerator opening exceeds the down-shift line before the elapse of a predetermined period of time, the downshifting to the target stage is continued. By contrast, if the accelerator opening does not exceed the down-shift line before the elapse of a predetermined period of time, the downshifting is discontinued.

JP-A-H6-219188 describes a control device for a power train for improving acceleration response with respect to an operation of an accelerator pedal. According to the teachings of JP-A-H6-219188, the control device detects a maximum depressing speed of the accelerator pedal within a predetermined time range from the commencement of depression of the accelerator pedal. Then, based on the detected maximum depressing speed, a maximum accelerator opening is predicted. In addition, timings of starting a shifting operation, activating a lockup clutch, supercharging an engine are advanced on the basis of the maximum accelerator opening. Further, fuel supply to the engine is also controlled on the basis of the maximum accelerator opening.

JP-H6-300125 discloses a control apparatus for controlling a shifting operation of an automatic transmission in line with an intention of a driver by predicting an operation amount of an accelerator. According to the teachings of JP-H6-300125, specifically, an estimate value of an operation amount the accelerator is computed using a nonlinear equation derived on the basis of three or more data about the operation amount of the accelerator. The shift control of the automatic transmission is executed based on the estimate value of an operation amount the accelerator.

JP-A-H6-117528 also describes a shift control device for an automatic transmission configured to control a shifting operation in line with an intention of a driver. According to the teachings of JP-A-H6-117528, an estimated throttle opening is computed based on detection values of a throttle opening and a change rate of the throttle opening, and a shifting operation of the automatic transmission is controlled based on the estimated throttle opening.

JP-A-2016-178794 describes a contactor control device for controlling a switching operation of a contactor disposed on an electric circuit between a motor and an inverter in an electric vehicle. According to the teachings of JP-A-2016-178794, a value of an accelerator opening to be detected by an accelerator sensor is estimated based on past data about operation of the vehicle, and a threshold value for switching the contractor is corrected based on the estimated accelerator opening.

According to the teachings of JP-A-2014-190498, when the accelerator opening is large and a target stage of the transmission is set to a stage two or more stages lower or higher than the current stage, a skip downshifting is executed to shift the gear stage directly to the target stage. Basically, a required time to shift the gear stage to the target stage can be reduced to improve a shifting response by executing the skip downshifting. In addition, as described, a variable speed estimation value is calculated based on the synthesized vectorized value of change amounts of an accelerator opening and a vehicle speed. According to the teachings of JP-A-2014-190498, therefore, accuracy to estimate the variable speed estimation value may be improved to adjust a direction and a length of the synthesized vector.

Such variable speed estimation value is estimated on the assumption that a change amount of the accelerator opening to be vectorized is constant. However, during the shifting operation, the change amount of the accelerator opening may not be always constant. Therefore, a change amount of the accelerator opening may not be estimated accurately, and hence the shifting control may not be executed properly. For example, given that a change amount of accelerator opening is large and the skip downshifting is required, an actual accelerator opening may be reduced after starting the skip downshifting and hence an operating point may not exceed a downshifting line of e.g., two stages lower than the current stage. In this case, the skip downshifting would be executed even if the condition to execute the skip downshifting is no longer satisfied. By contrast, given that a change amount of accelerator opening is small and the normal downshifting is required, an actual accelerator opening may be increased after starting the normal downshifting and hence the operating point may exceed the downshifting line of e.g., two stages lower than the current stage. In this case, the normal downshifting would be executed even if the condition to execute the skip downshifting is satisfied. In those cases, an intended shifting response and an intended acceleration response may not be achieved.

SUMMARY

Aspects of embodiments of the present disclosure have been conceived noting the foregoing technical problems, and it is therefore an object of the present disclosure to provide a vehicle control system configured to accurately control a vehicle by accurately estimating a position of an accelerator pedal.

The vehicle control system according to the embodiment of the present disclosure is applied to a vehicle having an accelerator operated by a driver. The vehicle control system comprises a controller that calculates a predicted value of a position of the accelerator operated to accelerate the vehicle, and that executes an acceleration expediting control based on the predicted value. In order to achieve the above-explained objective, according to the embodiment of the present disclosure, the controller is configured to: calculate a first predicted value of the position of the accelerator in a first phase of an operation of the accelerator in which a change amount of the position of the accelerator increases, by a first calculation procedure, based on the position of the accelerator in the first phase; calculate a second predicted value of the position of the accelerator in a second phase of the operation of the accelerator in which the change amount of the position of the accelerator plateaus, by a second calculation procedure, based on the position of the accelerator in the second phase; and employ the second predicted value as the predicted value of the position of the accelerator in a third phase in which the change amount of the position of the accelerator decreases.

In a non-limiting embodiment, the controller may be further configured to: obtain an initial increasing value of the change amount of the position of the accelerator at a point when the change amount of the position of the accelerator starts increasing in the first phase, and a current value of the position of the accelerator; and calculate the first predicted value by adding the initial increasing value of the change amount of the position of the accelerator to a doubled difference between the current value of the position of the accelerator and the initial increasing value of the change amount of the position of the accelerator.

In a non-limiting embodiment, the controller may be further configured to: obtain an initial increasing value of the change amount of the accelerator at a point when the change amount of the position of the accelerator starts increasing in the first phase, an initial plateauing value of the change amount of the position of the accelerator at a starting point of the second phase, and a current value of the position of the accelerator; calculate an intermediate value of the position of the accelerator by halving a total value of the initial plateauing value of the change amount of the position of the accelerator and the current value of the position of the accelerator; and calculate the second predicted value by adding the initial increasing value of the change amount of the position of the accelerator to a doubled difference between the intermediate value of the position of the accelerator and the initial increasing value of the change amount of the position of the accelerator.

In a non-limiting embodiment, the vehicle may comprise an automatic transmission that transmits torque between a prime mover and drive wheels. In addition, the controller may be further configured to control a timing to start a shifting operation of the automatic transmission by executing the acceleration expediting control based on the predicted value of the position of the accelerator.

In a non-limiting embodiment, a prime mover of the vehicle may include an engine having a supercharger. In addition, the controller may be further configured to control a timing to start supercharging of the supercharger by executing the acceleration expediting control based on the predicted value of the position of the accelerator.

In a non-limiting embodiment, the vehicle may include a hybrid vehicle in which a prime mover includes an engine and a motor. In addition, the controller may be further configured to control a timing to start the engine by executing the acceleration expediting control based on the predicted value of the position of the accelerator.

Thus, according to the embodiment of the present disclosure, a position of the accelerator operated to accelerate the vehicle is estimated. In other words, the predicted value of the position of the accelerator is calculated. As described, the acceleration expediting control is executed based on the predicted value of the position of the accelerator so as to control e.g., a timing to start a shifting operation of the transmission or to start the engine. In general, a depression of an accelerator may be divided into a first phase in which a change amount of the position of the accelerator increases, a second phase in which the change amount of the position of the accelerator plateaus, and a third phase in which the change amount of the position of the accelerator decreases. According to the embodiment of the present disclosure, the predicted value of the position of the accelerator is calculated in each phase by a specific calculation procedure. According to the embodiment of the present disclosure, therefore, position of the accelerator can be estimated accurately so that the acceleration expediting control is executed properly based on the predicted value of the position of the accelerator.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 1:
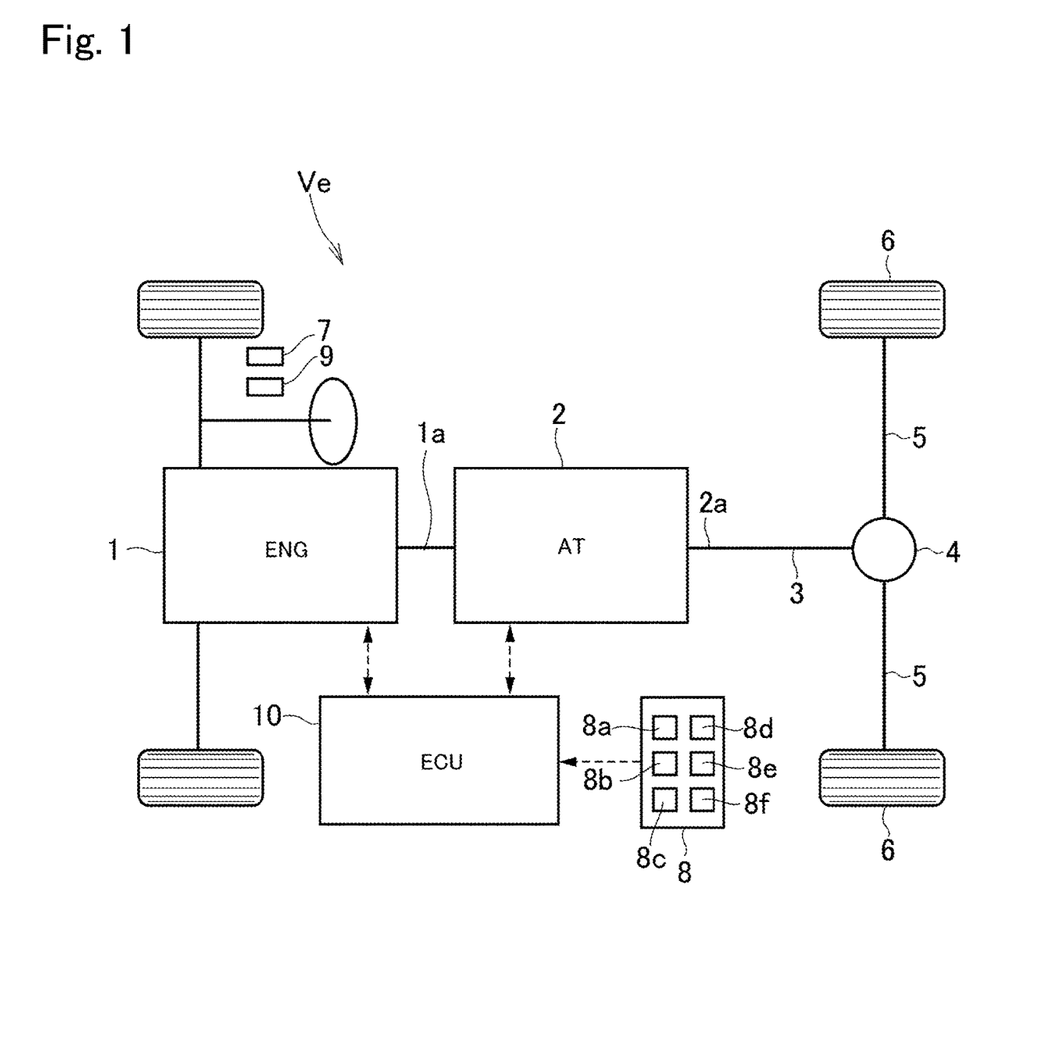
FIG. 1 is a schematic illustration showing one example of a structure and a control system of the vehicle to which the control system according to the embodiment of the present disclosure is applied.

Preferred embodiments of the present disclosure will now be explained with reference to the accompanying drawings. Referring now to FIG. 1, there is shown a structure of a vehicle Ve to which the vehicle control system according to the embodiment of the present disclosure is applied. The vehicle Ve shown in FIG. 1 is a rear-drive layout vehicle in which a power generated by the prime mover is delivered to a pair of rear wheels as drive wheels 6. The vehicle Ve comprises an engine (referred to as "ENG" in FIG. 1) 1 as a prime mover, and an automatic transmission (referred to as "AT" in FIG. 1) 2 is connected to an output side of the engine 1. The automatic transmission (as will be simply called the "transmission" hereinafter) 2 is connected to a differential gear unit 4 through a propeller shaft 3, and each of the drive wheels 6 is individually connected to the differential gear unit 4 through a driveshaft 5. Nonetheless, the vehicle control system may also be applied to a front-drive layout vehicle in which an output power of the engine is delivered to a pair of front wheels, and a four-wheel-drive layout vehicle in which an output power of the engine is distributed to each pair of front wheels and rear wheels.

For example, an internal combustion engine such as a gasoline engine and a diesel engine may be adopted as the engine 1. An output power of the engine 1 may be adjusted electrically, and the engine 1 may be started and stopped electrically according to need. Given that the gasoline engine is used as the engine 1, an opening degree of a throttle valve, an amount of fuel supply or fuel injection, a commencement and a termination of ignition, an ignition timing etc. may be controlled electrically. Otherwise, given that the diesel engine is used as the engine 1, an amount of fuel injection, an injection timing, an opening degree of a throttle valve of an Exhaust Gas Recirculation (EGR) system etc. may be controlled electrically.

The transmission 2 transmits a torque between the engine 1 and the drive wheels 6 while changing an input speed from an output shaft (i.e., a crankshaft) 1a of the engine 1. For example, a conventional automatic transmission having a planetary gear unit, and a clutch and a brake manipulated to establish a gear stage (neither of which are shown) may be adopted as the transmission 2. Instead, a dual clutch transmission (DCT) having two pairs of gears and a clutch for establishing gear stages may also be adopted as the transmission 2. Thus, the transmission 2 is a geared transmission in which a gear stage may be selected from at least three forward stages.

An output torque of the engine 1 is increased with an increase in a depression of an accelerator pedal 7 of an accelerator. In other words, an output torque of the engine 1 is changed in accordance with a position of the accelerator pedal 7. Specifically, an opening degree of a throttle valve of the engine 1 is increased by depressing the accelerator pedal 7.

The vehicle Ve is provided with a detector 8 for collecting data about the vehicle Ve. Specifically, the detector 8 comprises: an air flow meter 8a that detects a flow rate of air intake of the engine 1; an engine speed sensor 8b that detects a rotational speed of the output shaft 1a of the engine 1; an output speed sensor 8c that detects a rotational speed of an output shaft 2a of the transmission 2; an accelerator position sensor 8d that detects an operating amount (i.e., a depression or a position) of the accelerator pedal 7; a brake sensor (or a brake switch) 8e that detects a depression (or an operating amount) of a brake pedal 9 and a pedal force applied to the brake pedal 9; a wheel speed sensor 8f that detects rotational speeds of the drive wheels 6 as well as front wheels. The detector 8 is electrically connected to an after-mentioned controller 10 so that detection data based on detection values obtained by the sensors is transmitted to the controller 10 in the form of electric signal.

The vehicle Ve is controlled by the controller (referred to as "ECU" in FIG. 1) 10 as an electronic control unit including a microcomputer. The controller 10 performs a calculation using the data transmitted form the detector 8, and data and formulas and the like installed in advance. Calculation results are transmitted from the controller 10 to the engine 1, the transmission 2 and so on in the form of command signal. For example, the controller 10 controls a hydraulic control unit to execute a shifting operation of the transmission 2 thereby establishing a desired gear stage. Although only one controller 10 is depicted in FIG. 1, a plurality of controllers may be arranged in the vehicle Ve to control the specific devices individually.

In order to control the vehicle Ve properly based on a position of the accelerator pedal 7, the vehicle control system according to the embodiment of the present disclosure is configured to estimate a position of the accelerator pedal 7 operated by a driver to accelerate the vehicle Ve. To this end, the controller 10 executes a routine shown in FIG. 2.

Figure 2:
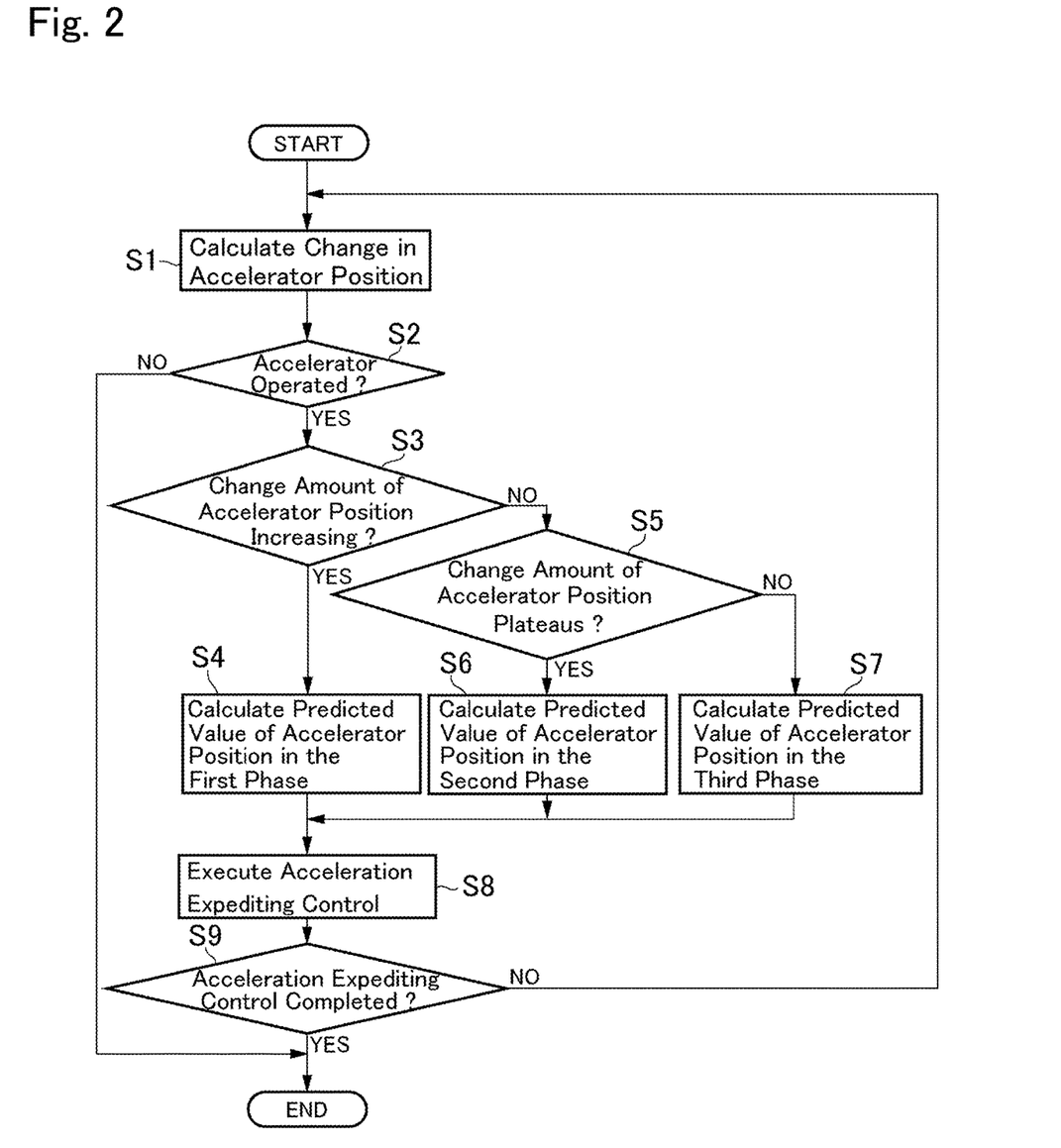
FIG. 2 is a flowchart showing one example of a routine executed by the control system according to the embodiment of the present disclosure.

The routine shown in FIG. 2 is executed when the driver starts an operation of the accelerator to accelerate the vehicle Ve. In order to determine an execution of the operation of the accelerator by the driver, at step S1, a change amount of a position of the accelerator pedal 7 is computed. For example, a change amount of the position of the accelerator pedal 7 within a period T1 from a point at which a depression of the accelerator pedal 7 starts increasing is computed based on a detection value of a depression of the accelerator pedal 7 detected by the accelerator position sensor 8d. To this end, a length of the period T1 is determined in advance based on a result of a simulation or a drive test.

Then, it is determined at step S2 whether the driver is operating the accelerator, in other words, whether the accelerator pedal 7 is currently being depressed. Specifically, it is determined whether the change amount of the position of the accelerator pedal 7 obtained at step S1 is greater than a threshold value D1 set based on a result of a simulation or a drive test.

If the change amount of the position of the accelerator pedal 7 is smaller than the threshold value D1 so that the answer of step S2 is NO, the routine returns without executing any specific controls. By contrast, if the change amount of the position of the accelerator pedal 7 is greater than the threshold value D1 so that the answer of step S2 is YES, the routine progresses to step S3.

Figure 3:
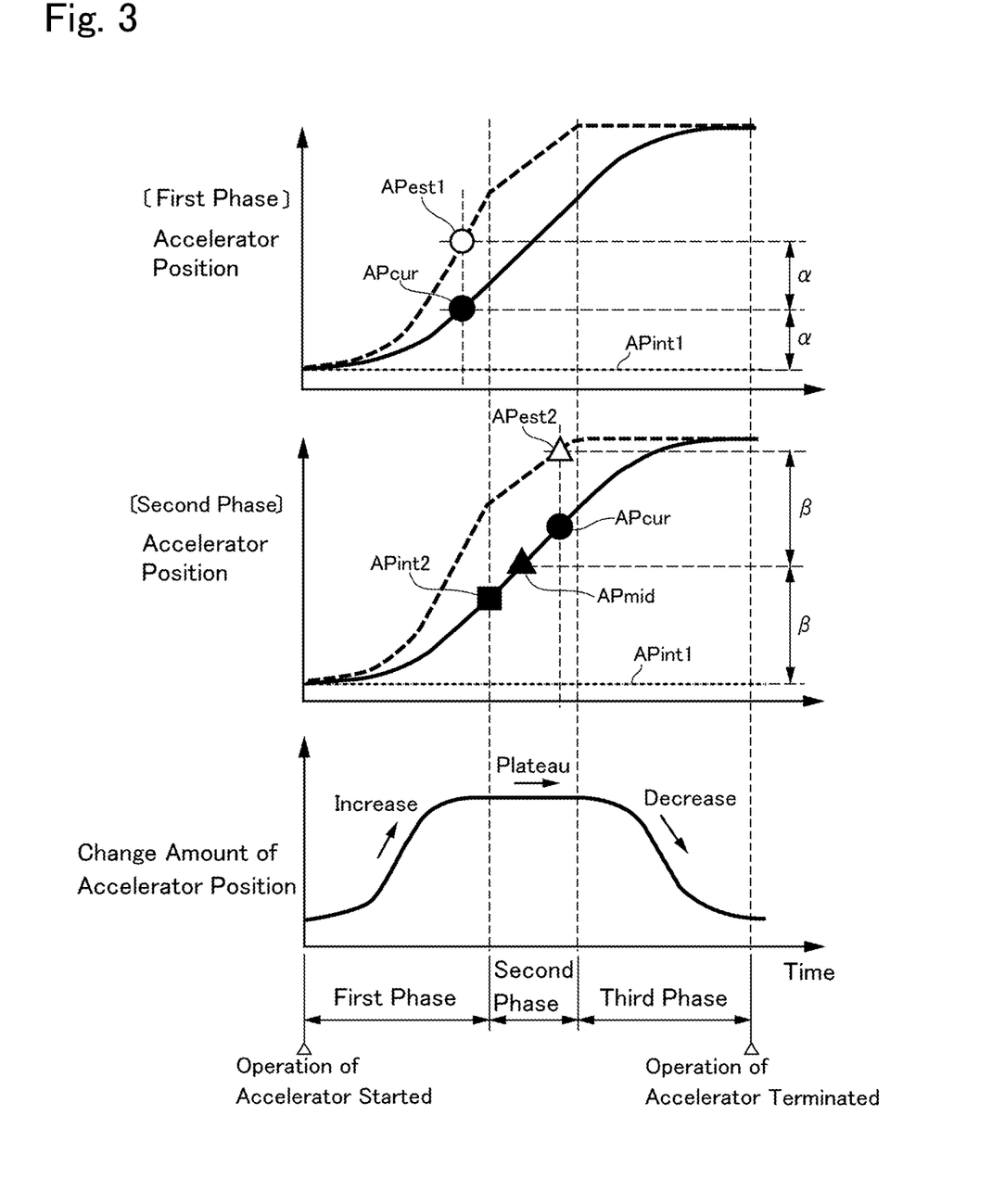
FIG. 3 is a time chart showing a position etc. of the accelerator pedal in each phase.

At step S3, it is determined whether the change amount of the position of the accelerator pedal 7 is increasing. The accelerator pedal 7 or an accelerator lever (not shown) is operated manually by a foot or a hand of the driver. A motion of a human being to operate such a mechanical device, e.g., a reaching movement between a start point and an end point of the motion, or a motion model of generation of the motion has been analyzed based on a minimum jerk model or a minimum torque-change model. For example, in the case of depressing the accelerator pedal 7, a waveform representing a change amount (or a change rate) of the position of the accelerator pedal 7 with respect to time based on the minimum jerk model will be a bell-shape as indicated in FIG. 3. According to the embodiment of the present disclosure, therefore, the vehicle control system is configured based on an assumption that the position of the accelerator is changed equally in both initial phase of an operation of the accelerator pedal 7 in which the change amount of the position of the accelerator pedal 7 increases, and final phase of the operation of the accelerator pedal 7 in which the change amount of the position of the accelerator pedal 7 decreases. For example, in the time chart shown in FIG. 3, the waveform representing the change amount of the position of the accelerator pedal 7 is symmetrical across an intermediate time point. According to the embodiment of the present disclosure, specifically, the operation of the accelerator pedal 7 is divided into a first phase in which a change amount of the position of the accelerator pedal 7 increases, a second phase in which the change amount of the position of the accelerator pedal 7 plateaus, and a third phase in which the change amount of the position of the accelerator pedal 7 decreases.

At step S3, specifically, it is determined whether the operation of the accelerator pedal 7 is currently in the first phase. Specifically, in order to determine a phase of the operation of the accelerator pedal 7, it is determined whether the change amount of the position of the accelerator pedal 7 within a period T2 from the point at which the depression of the accelerator pedal 7 starts increasing is greater than a threshold value D2. If the change amount of the position of the accelerator pedal 7 within the period T2 is greater than the threshold value D2, the controller 10 determines that the phase of the operation of the accelerator pedal 7 is the first phase. To this end, a length of the period T2, and the threshold value D2 of the change amount of the position of the accelerator pedal 7 are set based on a result of a simulation or a drive test.

If the change amount of the position of the accelerator pedal 7 is being increased, in other words, if the phase of the operation of the accelerator pedal 7 is the first phase so that the answer of step S3 is YES, the routine progresses to step S4.

At step S4, a first predicted value of the position of the accelerator pedal 7 as an estimated depression of the accelerator pedal 7 being increased in the first phase is calculated by a first calculation procedure based on the position of the accelerator pedal 7 in the first phase.

The first calculation procedure is a formula formulated in advance, and the procedure to calculate the first predicted value by the first calculation procedure will be explained hereinafter. At step S4, specifically, an initial increasing value of the change amount of the position of the accelerator pedal 7 at a point when the change amount of the position of the accelerator pedal 7 starts increasing in the first phase, and a current value of the position of the accelerator pedal 7, are detected. Then, the first predicted value is calculated by adding the initial increasing value of the change amount of the position of the accelerator pedal 7 to a doubled difference between the current value of the position of the accelerator pedal 7 and the initial increasing value of the change amount of the position of the accelerator pedal 7.

As can be seen from FIG. 3, in the first phase, it can be assumed that a length of time that the change amount of the position of the accelerator pedal 7 decreases is identical to a length of time that the change amount of the position of the accelerator pedal 7 increases. Accordingly, it can be predicted that the depression of the accelerator pedal 7 will be further increased in the first phase by a doubled value of the current value of the position of the accelerator pedal 7. Specifically, given that the initial increasing value of the change amount of the position of the accelerator pedal 7 is APint1, and the current value of the position of the accelerator pedal 7 is APcur, the first predicted value APest1 of the position of the accelerator pedal 7 can be calculated by the following formula:

$$APest1 = APint1 + (APcur - APint1) \cdot 2.$$

Otherwise, if the change amount of the position of the accelerator pedal 7 is not being increased, in other words, if the phase of the operation of the accelerator pedal 7 is not the first phase so that the answer of step S3 is NO, the routine progresses to step S5.

At step S5, it is determined whether the change amount of the position of the accelerator pedal 7 plateaus, that is, it is determined whether the phase of the operation of the accelerator pedal 7 is the second phase. Specifically, it is determined whether an absolute value of the change amount of the position of the accelerator pedal 7 within the period T2 from the point at which the depression of the accelerator pedal 7 starts increasing is smaller than a threshold value D3. In order to determine a phase change of the operation of the accelerator pedal 7, the threshold value D3 is set based on a result of a simulation or a drive test. If the absolute value of the change amount of the position of the accelerator pedal 7 is smaller than the threshold value D3, the controller 10 determines that the phase of the operation of the accelerator pedal 7 is the second phase.

If the change amount of the position of the accelerator pedal 7 plateaus, that is, if the phase of the operation of the accelerator pedal 7 is the second phase so that the answer of step S5 is YES, the routine progresses to step S6.

At step S6, a second predicted value of the position of the accelerator pedal 7 in the second phase is calculated by a second calculation procedure based on the position of the accelerator pedal 7 in the second phase.

The second calculation procedure is a formula formulated in advance, and the procedure to calculate the second predicted value by the second calculation procedure will be explained hereinafter. At step S6, specifically, the initial increasing value of the change amount of the position of the accelerator pedal 7 at the point when the change amount of the position of the accelerator pedal 7 starts increasing in the first phase, an initial plateauing value of the change amount of the position of the accelerator pedal 7 at a starting point of the second phase, and a current value of the position of the accelerator pedal 7, are detected. Then, an intermediate value of the position of the accelerator pedal 7 is calculated by halving a total value of the initial plateauing value of the change amount of the position of the accelerator pedal 7 and the current value of the position of the accelerator pedal 7. At the same time, the second predicted value is calculated by adding the initial increasing value of the change amount of the position of the accelerator pedal 7 to a doubled difference between the intermediate value of the position of the accelerator pedal 7 and the initial increasing value of the change amount of the position of the accelerator pedal 7.

As can be seen from FIG. 3, in the second phase in which the change amount of the position of the accelerator pedal 7 plateaus, position of the accelerator pedal 7, that is, depression of the accelerator pedal 7 increases in the first half and the latter half of the second phase. Specifically, in the case of depressing the accelerator pedal 7, the depressing amount of the accelerator pedal 7 increases in the first half, and the depressing amount of the accelerator pedal 7 decreases in the latter half. In the second phase, therefore, the intermediate value of the position of the accelerator pedal 7 at the intermediate point of the symmetrical waveform representing the change amount of the position of the accelerator pedal 7 is calculated. Then, the predicted value of the position of the accelerator pedal 7 is calculated based on the intermediate value. Specifically, given that the intermediate value of the position of the accelerator pedal 7 is APmid, the initial increasing value of the change amount of the position of the accelerator pedal 7 is APint1, and the initial plateauing value of the change amount of the position of the accelerator pedal 7 is APint2, the second predicted value APest2 of the position of the accelerator pedal 7 can be calculated by the following formula:

$$APest2 = APint2 + (APmid - APint2) \cdot 2.$$

In this case, given that the current value of the position of the accelerator pedal 7 is APcur, the intermediate value APmid of the position of the accelerator pedal 7 is calculated by the following formula:

$$APmid=(APint2+APcur)/2.$$

Otherwise, if the change amount of the position of the accelerator pedal 7 does not plateau, that is, if the phase of the operation of the accelerator pedal 7 is not the first phase or the second phase so that the answer of step S5 is NO, the routine progresses to step S7.

At step S7, the second predicted value of the position of the accelerator pedal 7 calculated in the second phase is maintained. That is, when the phase of the operation of the accelerator pedal 7 shifts from the second phase to the third phase, the second predicted value APest2 is maintained, and in the third phase, the second predicted value APest2 calculated in the second phase is employed as the predicted value of the accelerator pedal 7.

Thus, according to the embodiment of the present disclosure, when the driver depresses the accelerator pedal 7 to accelerate the vehicle Ve, a position of the accelerator pedal 7 being increased is estimated at step S4, S6, or S7. Specifically, the predicted value of the position of the accelerator pedal 7 is computed in each of the first phase, the second phase, and the third phase by the specific calculation procedure adapted to each phase. According to the embodiment of the present disclosure, therefore, a final position of the accelerator pedal 7 being depressed can be estimated accurately based on the predicted value of the position of the accelerator pedal 7.

After calculating or setting the predicted value of the position of the accelerator pedal 7 at step S4, S6, or S7, the routine progresses to step S8.

Figure 4:
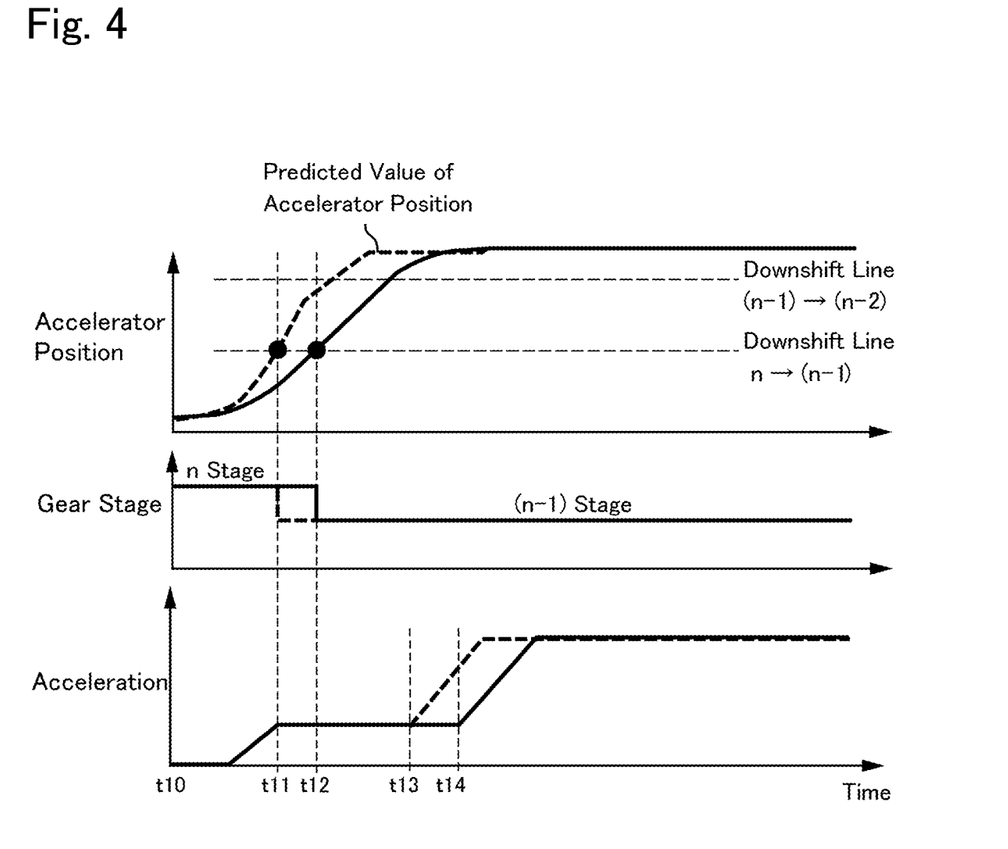
FIG. 4 is a time chart showing temporal changes in a gear stage and an acceleration during execution of a normal downshifting by the routine shown in FIG. 2.
Figure 5:
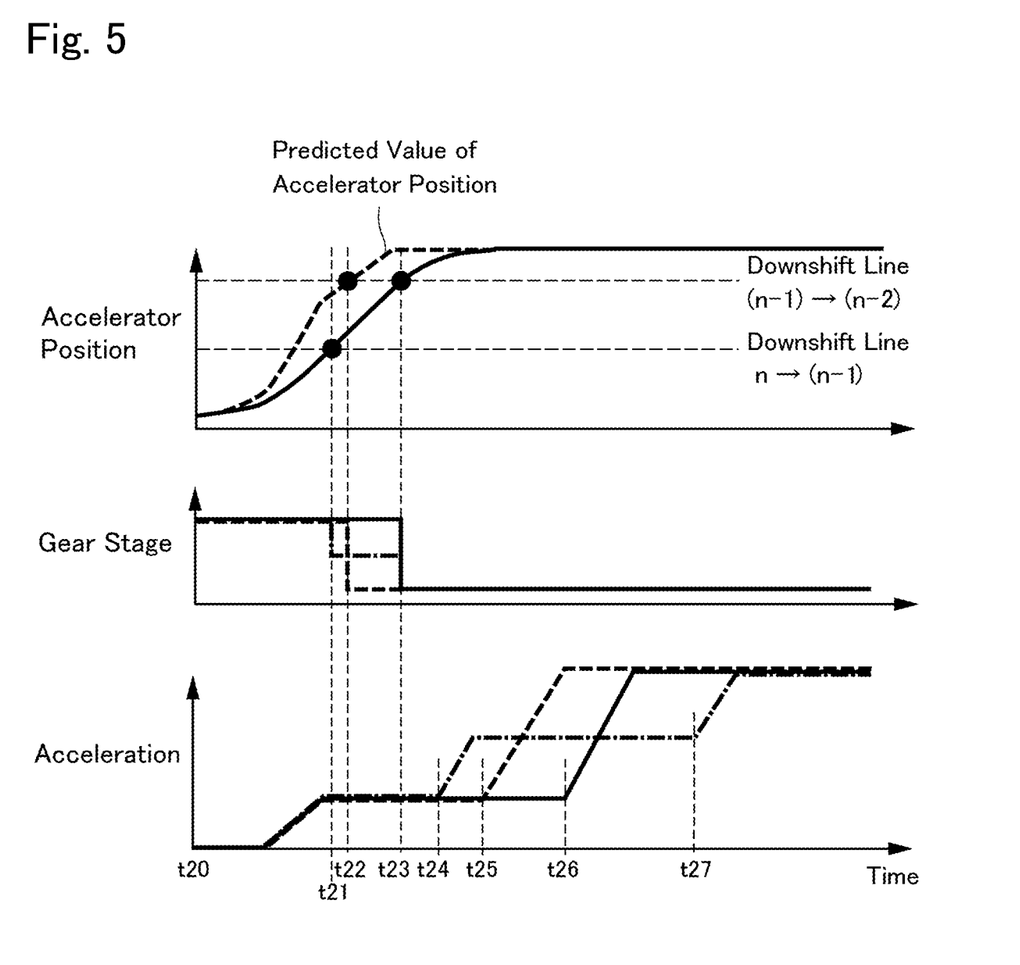
FIG. 5 is a time chart showing temporal changes in the gear stage and the acceleration during execution of a skip downshifting by the routine shown in FIG. 2.

At step S8, an acceleration expediting control is executed based on the predicted value of the position of the accelerator pedal 7 calculated or set at step S4, S6, or S7. At step S8, for example, shifting controls of the transmission 2 shown in FIGS. 4 and 5 are executed to generate a drive force to accelerate the vehicle Ve in response to the operation of the accelerator pedal 7 executed by the driver. Such acceleration expediting control at step S8 may also be executed as an independent routine.

After executing the acceleration expediting control based on the predicted value of the position of the accelerator pedal 7, the routine progresses to step S9.

At step S9, it is determined whether the acceleration expediting control has been completed. If the acceleration expediting control has not yet been completed so that the answer of step S9 is NO, the routine returns to step S1 to repeat the foregoing steps. By contrast, if the acceleration expediting control has been completed so that the answer of step S9 is YES, the routine terminates.

Examples of the acceleration expediting control executed at step S8 are shown in FIGS. 4 and 5. Specifically, FIG. 4 shows an example to execute the acceleration expediting control when shifting a gear stage downwardly from a current stage stepwise to a target stage. In FIG. 4, the dashed curves respectively represent the predicted value of the position of the accelerator pedal 7, and the gear stage and the acceleration changed by the acceleration expediting control. On the other hand, the solid curves respectively represent an actual position of the accelerator pedal 7, and the gear stage and the acceleration changed without using the predicted value of the position of the accelerator pedal 7.

In the example shown in FIG. 4, the driver starts operating the accelerator pedal 7 at point t10, and consequently an actual depression of the accelerator pedal 7 starts increasing from point t10. Then, in the case of carrying out the downshifting without using the predicted value of the position of the accelerator pedal 7, the position of the accelerator pedal 7 exceeds the downshift line from the stage n to the stage n−1 at point t12 so that the gear stage is shifted from the current stage n to the stage n−1 that is one stage lower than the current stage n. As a result, the acceleration of the vehicle Ve starts increasing from point t14.

On the other hand, in the case of carrying out the downshifting using the predicted value of the position of the accelerator pedal 7, the predicted value of the position of the accelerator pedal 7 exceeds the downshift line from the stage n to the stage n−1 at point t11 after the driver starts operating the accelerator pedal 7 at point t10. Thus, the predicted value of the position of the accelerator pedal 7 exceeds the downshift line from the stage n to the stage n−1 earlier than point t12. Consequently, the gear stage is shifted from the current stage n to the stage n−1 that is one stage lower than the current stage n at point t11. As a result, the acceleration of the vehicle Ve starts increasing from point t13 which is earlier than point t14.

By thus executing the acceleration expediting control using the predicted value of the position of the accelerator pedal 7, a shifting command to execute the downshifting is transmitted at an earlier timing. As a result, the drive force is increased earlier by the downshifting to accelerate the vehicle Ve smoothly. That is, the acceleration response is improved.

FIG. 5 shows an example to execute the acceleration expediting control when shifting the gear stage by a skip downshifting from a current stage to a target stage that is two or more stages lower than the current stage. In FIG. 5, the dashed curves respectively represent the predicted value of the position of the accelerator pedal 7, and the gear stage and the acceleration changed by the acceleration expediting control. The solid curves respectively represent an actual position of the accelerator pedal 7, and the gear stage and the acceleration changed without using the predicted value of the position of the accelerator pedal 7. The dashed-dotted curves respectively represent the gear stage and the acceleration changed by shifting the gear stage stepwise from the current stage to the target stage without using the predicted value of the position of the accelerator pedal 7.

In the example shown in FIG. 5, the driver starts operating the accelerator pedal 7 at point t20, and consequently an actual depression of the accelerator pedal 7 starts increasing from point t20. Then, in the case of carrying out the skip downshifting without using the predicted value of the position of the accelerator pedal 7, the skip downshifting from the current stage n to the target stage n−2 that is two stages lower than the current stage n is commenced when the position of the accelerator pedal 7 exceeds the downshift line from the stage n−1 to the stage n−2 at point t23. As a result, the acceleration of the vehicle Ve starts increasing from point t26.

Thus, according to the conventional skip downshifting, the skip downshifting will not be commenced until the position of the accelerator pedal 7 exceeds the downshift line from the stage n−1 to the stage n−2. If it takes a too long time until the position of the accelerator pedal 7 exceeds the downshift line from the stage n−1 to the stage n−2, the skip downshifting may not be executed. In this case, the normal stepwise downshifting is executed as indicated by the dashed-dotted curve. Specifically, a downshifting from the current stage n to the stage n−1 that is one stage lower than the current stage n is executed when the position of the accelerator pedal 7 exceeds the downshift line from the stage n to the stage n−1 at point t21. As a result, the acceleration of the vehicle Ve is increased at point t24. Thereafter, a downshifting from the stage n−1 to the stage n−2 that is two stages lower than the current stage n is executed when the position of the accelerator pedal 7 exceeds the downshift line from the stage n−1 to the stage n−2 at point t23. As a result, the acceleration of the vehicle Ve is further increased at point t27.

On the other hand, in the case of carrying out the skip downshifting using the predicted value of the position of the accelerator pedal 7, the predicted value of the position of the accelerator pedal 7 exceeds the downshift line from the stage n−1 to the stage n−2 at point t22 after the driver starts operating the accelerator pedal 7 at point t20. Consequently, the skip downshifting from the current stage n to the stage n−2 is executed at point t22. As a result, the acceleration of the vehicle Ve starts increasing linearly from point t25 which is earlier than points t26 and t27.

By thus executing the acceleration expediting control using the predicted value of the position of the accelerator pedal 7, the shifting command to execute the downshifting is transmitted at an earlier timing. As a result, the shifting response and the acceleration response can be improved especially in the case of executing the skip downshifting. As described, according to the embodiment of the present disclosure, the predicted value of the position of the accelerator pedal 7 can be estimated accurately. Therefore, it is not necessary to wait for a long time until the commencement of the skip downshifting. In addition, it is possible to prevent an erroneous execution of the normal downshifting after transmitting an execution command of the skip downshifting. That is, the skip downshifting can be executed properly. For these reasons, the shifting response and the acceleration response can be further improved.

The acceleration expediting control according to the embodiment of the present disclosure may also be executed in a vehicle in which the engine has a supercharger to control a timing to execute a supercharging.

Figure 6:
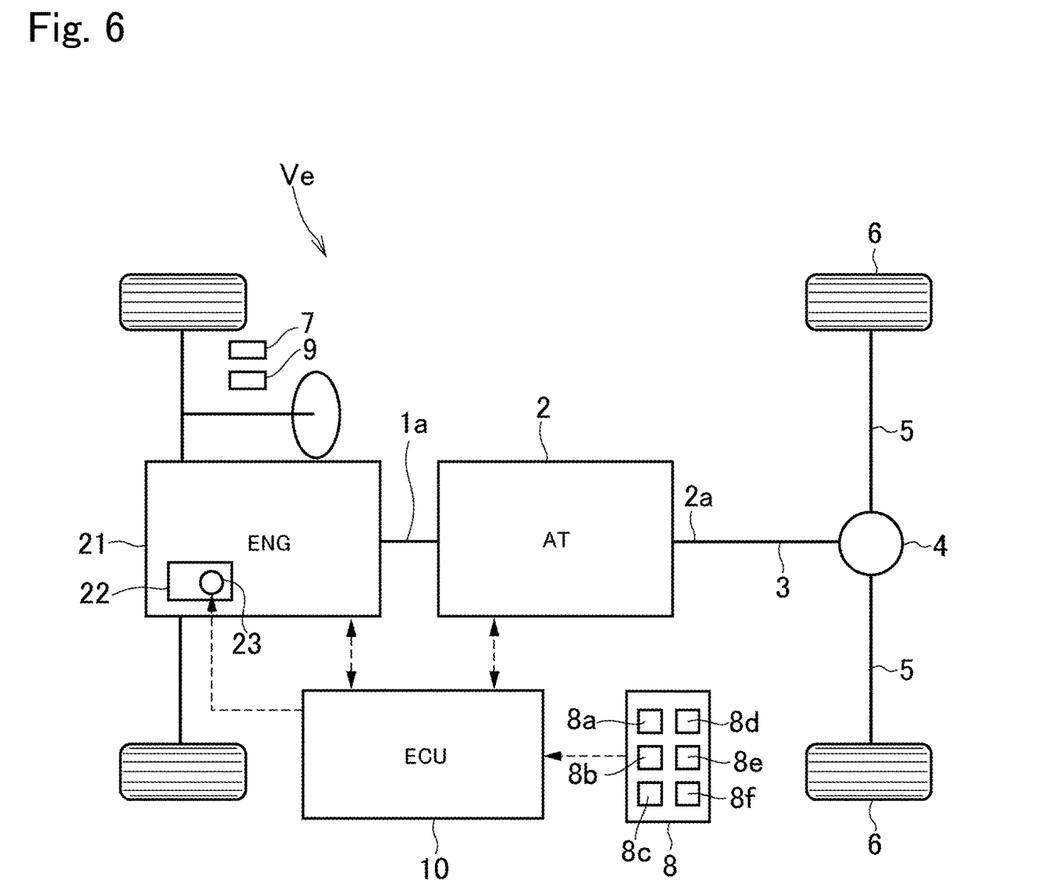
FIG. 6 is a schematic illustration showing another example of a structure of the vehicle to which the control system according to the embodiment of the present disclosure is applied.

Turning to FIG. 6, there is shown another example of the vehicle Ve to which the control system according to the embodiment of the present disclosure is applied. The vehicle Ve shown in FIG. 6 also comprises an engine (referred to as "ENG" in FIG. 6) 21 as a prime mover. In FIG. 6, common reference numerals are allotted to the elements in common with those of the vehicle Ve shown in FIG. 1.

A structure of the engine 21 is fundamentally identical to that of the engine 1 shown in FIG. 1. For example, an internal combustion engine such as a gasoline engine and a diesel engine may also be adopted as the engine 21. Accordingly, an output power of the engine 21 may be adjusted electrically, and the engine 21 may be started and stopped electrically. The engine 1 is provided with a supercharger 22 as a conventional compressor that increases a pressure of intake air. In the example shown in FIG. 22, specifically, a turbocharger in which a turbine (not shown) is driven by exhaust energy from the engine 21 is adopted as the supercharger 22. The supercharger 22 comprises a wastegate valve 23 that is actuated electrically. The wastegate valve 23 is connected electrically to the controller 10 so that the wastegate valve 23 is controlled by a command signal transmitted from the controller 10. A supercharging pressure generated by the supercharger 22 and timings to start and stop supercharging can be controlled by opening and closing the wastegate valve 23.

Alternatively, a mechanically-driven supercharger in which a turbine is driven by an output torque of the engine 21 may also be adopted as the supercharger 22. In this case, an electromagnetic clutch (not shown) is arranged e.g., between an output shaft of the engine 21 and the supercharger 22. The electromagnetic clutch is connected electrically to the controller 10 so that the electromagnetic clutch is controlled by a command signal transmitted from the controller 10. In this case, a supercharging pressure generated by the supercharger 22 and timings to start and stop supercharging can be controlled by engaging and disengaging the electromagnetic clutch.

In the vehicle Ve shown in FIG. 6, a timing to start the supercharging by the supercharger 22 can be controlled by executing the above-explained acceleration expediting control.

Figure 7:
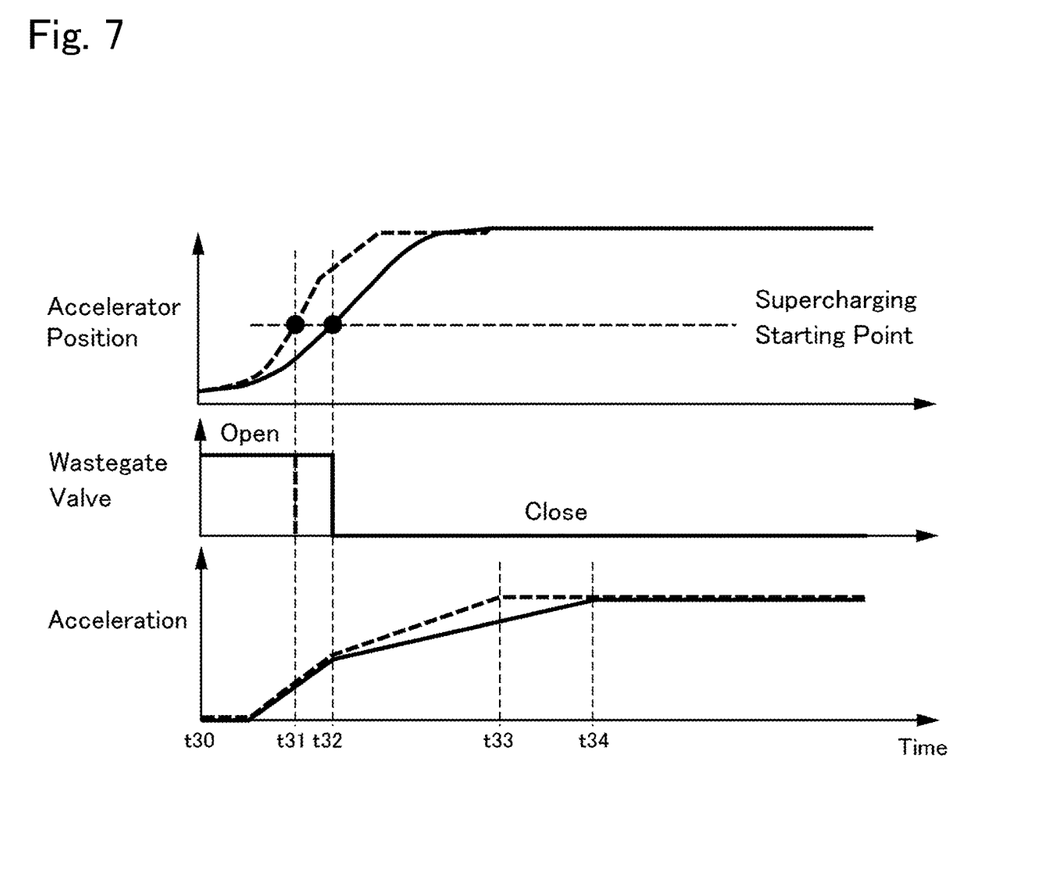
FIG. 7 is a time chart showing temporal changes in an activation of a wastegate valve and an acceleration in the vehicle shown in FIG. 6 during execution of the routine shown in FIG. 2.

An example of controlling the timing to start the supercharging by the acceleration expediting control is shown in FIG. 7. In FIG. 7, the dashed curves respectively represent the predicted value of the position of the accelerator pedal 7, and an activation state of the wastegate valve 23 and the acceleration changed by the acceleration expediting control. On the other hand, the solid curves respectively represent an actual position of the accelerator pedal 7, and an activation state of the wastegate valve 23 and the acceleration changed without using the predicted value of the position of the accelerator pedal 7.

In the example shown in FIG. 7, the driver starts operating the accelerator pedal 7 at point t30, and consequently an actual depression of the accelerator pedal 7 starts increasing from point t30. Then, in the case of accelerating the vehicle Ve without using the predicted value of the position of the accelerator pedal 7, the position of the accelerator pedal 7 reaches a supercharging starting point (i.e., a threshold value) at point t23 so that the wastegate valve 23 is closed. As a result, the acceleration of the vehicle Ve increases from point t32 to point t34 at a rate shown in FIG. 7.

On the other hand, in the case of accelerating the vehicle Ve using the predicted value of the position of the accelerator pedal 7, the predicted value of the position of the accelerator pedal 7 reaches the supercharging starting point at point t31 which is earlier than point t32 so that the wastegate valve 23 is closed at point t31. As a result, the acceleration of the vehicle Ve increases from point t32 to point t33 at a higher rate as shown in FIG. 7.

By thus executing the acceleration expediting control using the predicted value of the position of the accelerator pedal 7, a command to close the wastegate valve 23 is transmitted at an earlier timing. As a result, the wastegate valve 23 is closed in advance when supercharging the engine 21 so that the drive force is increased earlier to accelerate the vehicle Ve smoothly. That is, the supercharging response and the acceleration response can be improved.

The acceleration expediting control according to the embodiment of the present disclosure may also be executed in a hybrid vehicle in which the prime mover includes the engine and a motor to control a timing to start the engine.

Figure 8:
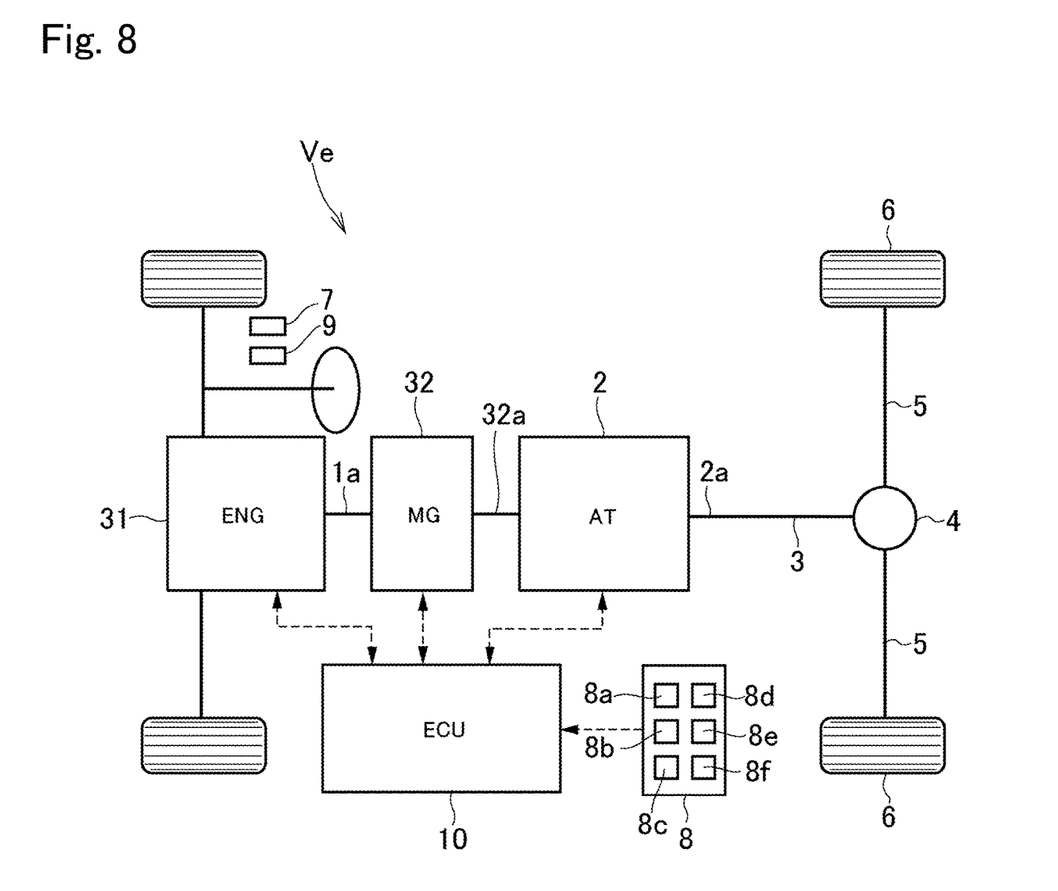
FIG. 8 is a schematic illustration showing still another example of a structure of the vehicle to which the control system according to the embodiment of the present disclosure is applied.

Turning to FIG. 8, there is shown still another example of the vehicle Ve to which the control system according to the embodiment of the present disclosure is applied. In the vehicle Ve shown in FIG. 8, the prime mover includes an engine (referred to as "ENG" in FIG. 8) 31 and a motor (referred to as "MG" in FIG. 8) 32. In FIG. 8, common reference numerals are allotted to the elements in common with those of the vehicle Ve shown in FIG. 1.

A structure of the engine 31 is fundamentally identical to that of the engine 1 shown in FIG. 1. For example, an internal combustion engine such as a gasoline engine and a diesel engine may also be adopted as the engine 31. Accordingly, an output power of the engine 31 may be adjusted electrically, and the engine 31 may be started and stopped electrically.

The motor 32 as a motor-generator is disposed on the output side of the engine 31. The motor 32 serves not only as a motor to generate torque when driven by electricity suppled thereto, but also as a generator to generate electricity when driven by an output torque of the engine 31. For example, a permanent magnet type synchronous motor, and an induction motor may be adopted as the motor 32.

The motor 32 is connected to a battery through an inverter (neither of which are shown) so that the electricity generated by the motor 32 can be accumulated in the battery. Specifically, the motor 32 may be operated as a motor to generate torque by supplying the electricity accumulated in the battery to the motor 32. An output shaft 32a of the motor 32 is connected to an input shaft (not shown) of the transmission 2 so that an output torque of the motor 32 is delivered to the drive wheels 6 through the transmission 2 to propel the vehicle Ve.

An operating mode of the vehicle Ve shown in FIG. 8 may be selected form a plurality of modes by controlling the engine 31 and the motor 32 by the controller 10. For example, the operating mode of the vehicle Ve may be selected from: an electric vehicle mode (to be abbreviated as the "EV mode" hereinafter) in which a drive force is generated by delivering torque generated by the motor 32 to the drive wheels 6 while stopping the engine 31; and a parallel hybrid vehicle mode (to be abbreviated as the "HV mode" hereinafter) in which the engine 31 is operated to deliver torques generated by the engine 31 and the motor 32 are delivered to the drive wheels 6. Although not especially shown, the prime mover may be further provided with another motor for generating torque to be delivered to the drive wheels 6. In this case, the vehicle Ve shown in FIG. 8 may be operated in a series hybrid vehicle mode in which the engine 31 is operated while bringing the transmission 2 into the neutral stage, the motor 32 is operated as a generator by a torque of the engine 31 to generate electricity, and a drive force is generated by delivering torque generated by another motor to the drive wheels 6.

In the vehicle Ve shown in FIG. 8, a timing to start the engine 31 when shifting the operating mode from the EV mode to the HV mode may also be controlled by executing the above-explained acceleration expediting control.

Figure 9:
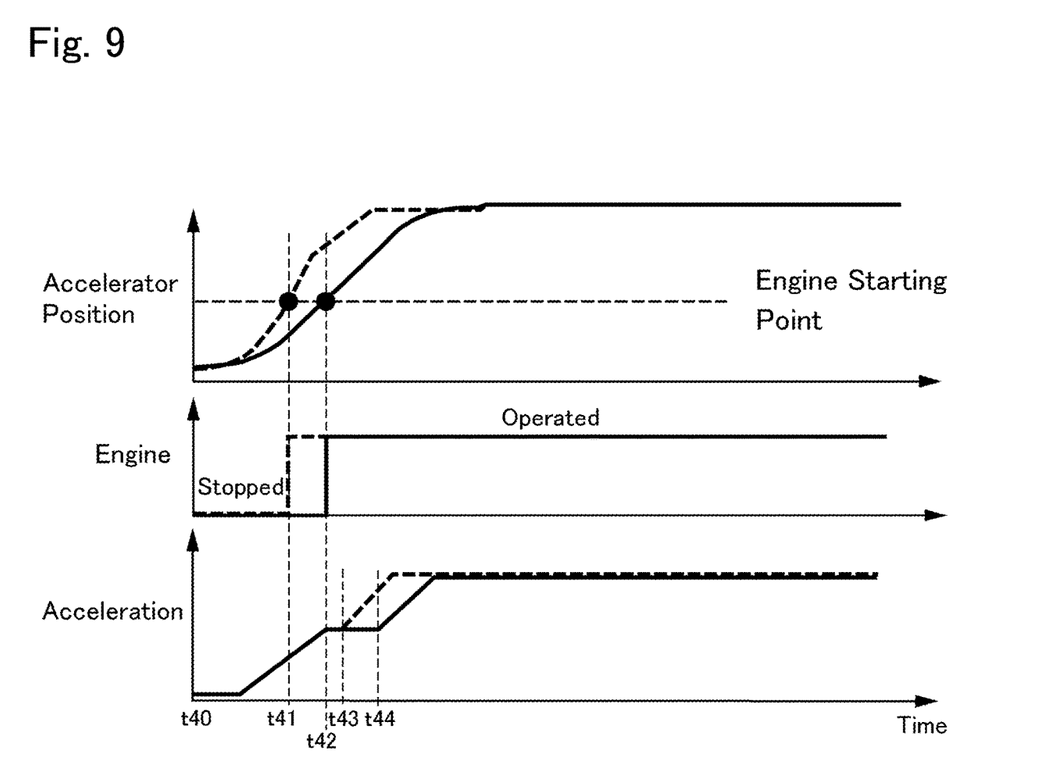
FIG. 9 is time chart showing temporal changes in an activation of an engine and an acceleration in the vehicle shown in FIG. 8 during execution of the routine shown in FIG. 2.

An example of controlling the timing to start the engine 31 by the acceleration expediting control is shown in FIG. 9. In FIG. 9, the dashed curves respectively represent the predicted value of the position of the accelerator pedal 7, and an activation state of the engine 31 and the acceleration changed by the acceleration expediting control. On the other hand, the solid curves respectively represent an actual position of the accelerator pedal 7, and an activation state of the engine 31 and the acceleration changed without using the predicted value of the position of the accelerator pedal 7.

In the example shown in FIG. 9, the driver starts operating the accelerator pedal 7 at point t40, and consequently an actual depression of the accelerator pedal 7 starts increasing from point t40. Then, in the case of accelerating the vehicle Ve without using the predicted value of the position of the accelerator pedal 7, the position of the accelerator pedal 7 reaches an engine starting point (i.e., a threshold value) at point t42 so that the engine 31 is started. As a result, the acceleration of the vehicle Ve increases from point t44. Thus, in the case of accelerating the vehicle Ve without using the predicted value of the position of the accelerator pedal 7, commencement of increase in the acceleration is inevitably delayed from point t42 at which the engine 31 is started to point t44.

On the other hand, in the case of accelerating the vehicle Ve using the predicted value of the position of the accelerator pedal 7, the predicted value of the position of the accelerator pedal 7 reaches the engine starting point at point t41 which is earlier than point t42 so that the engine 31 is started at point t41. As a result, the acceleration of the vehicle Ve increases from point t43 which is earlier than point t44. That is, response delay in the acceleration after starting the engine 31 is reduced compared to the case of starting the engine 31 without using the predicted value of the position of the accelerator pedal 7.

By thus executing the acceleration expediting control using the predicted value of the position of the accelerator pedal 7, a command to start the engine 31 is transmitted at an earlier timing. As a result, the engine 31 is started promptly when shifting the operating mode from the EV mode to the HV mode. For this reason, the drive force can be increased promptly by the engine torque to accelerate the vehicle Ve smoothly. That is, the acceleration response can be improved.

Although the above exemplary embodiments of the present disclosure have been described, it will be understood by those skilled in the art that the present disclosure should not be limited to the described exemplary embodiments, and various changes and modifications can be made within the scope of the present disclosure.

What is claimed is:

1. A vehicle control system that is applied to a vehicle having an accelerator operated by a driver, and that executes an acceleration expediting control based on a predicted value of a position of the accelerator operated to accelerate the vehicle calculated by a controller, wherein the controller is configured to:

calculate a first predicted value of the position of the accelerator in a first phase of an operation of the accelerator in which a change amount of the position of the accelerator increases, by a first calculation procedure, based on the position of the accelerator in the first phase;

calculate a second predicted value of the position of the accelerator in a second phase of the operation of the accelerator in which the change amount of the position of the accelerator plateaus, by a second calculation procedure, based on the position of the accelerator in the second phase; and employ the second predicted value as the predicted value of the position of the accelerator in a third phase in which the change amount of the position of the accelerator decreases.

2. The vehicle control system as claimed in claim 1, wherein the controller is further configured to:

obtain an initial increasing value of the change amount of the position of the accelerator at a point when the change amount of the position of the accelerator starts increasing in the first phase, and a current value of the position of the accelerator; and calculate the first predicted value by adding the initial increasing value of the change amount of the position of the accelerator to a doubled difference between the current value of the position of the accelerator and the initial increasing value of the change amount of the position of the accelerator.

3. The vehicle control system as claimed in claim 2,
wherein the vehicle comprises an automatic transmission that transmits torque between a prime mover and drive wheels, and
wherein the controller is further configured to control a timing to start a shifting operation of the automatic transmission by executing the acceleration expediting control based on the predicted value of the position of the accelerator.

4. The vehicle control system as claimed in claim 2,
wherein a prime mover of the vehicle includes an engine having a supercharger, and
wherein the controller is further configured to control a timing to start supercharging of the supercharger by executing the acceleration expediting control based on the predicted value of the position of the accelerator.

5. The vehicle control system as claimed in claim 2,
wherein the vehicle includes a hybrid vehicle in which a prime mover includes an engine and a motor, and
wherein the controller is further configured to control a timing to start the engine by executing the acceleration expediting control based on the predicted value of the position of the accelerator.

6. The vehicle control system as claimed in claim 1, wherein the controller is further configured to:
obtain an initial increasing value of the change amount of the accelerator at a point when the change amount of the position of the accelerator starts increasing in the first phase, an initial plateauing value of the change amount of the position of the accelerator at a starting point of the second phase, and a current value of the position of the accelerator;
calculate an intermediate value of the position of the accelerator by halving a total value of the initial plateauing value of the change amount of the position of the accelerator and the current value of the position of the accelerator; and
calculate the second predicted value by adding the initial increasing value of the change amount of the position of the accelerator to a doubled difference between the intermediate value of the position of the accelerator and the initial increasing value of the change amount of the position of the accelerator.

7. The vehicle control system as claimed in claim 6,
wherein the vehicle comprises an automatic transmission that transmits torque between a prime mover and drive wheels, and
wherein the controller is further configured to control a timing to start a shifting operation of the automatic transmission by executing the acceleration expediting control based on the predicted value of the position of the accelerator.

8. The vehicle control system as claimed in claim 6,
wherein a prime mover of the vehicle includes an engine having a supercharger, and
wherein the controller is further configured to control a timing to start supercharging of the supercharger by executing the acceleration expediting control based on the predicted value of the position of the accelerator.

9. The vehicle control system as claimed in claim 6,
wherein the vehicle includes a hybrid vehicle in which a prime mover includes an engine and a motor, and
wherein the controller is further configured to control a timing to start the engine by executing the acceleration expediting control based on the predicted value of the position of the accelerator.

10. The vehicle control system as claimed in claim 1,
wherein the vehicle comprises an automatic transmission that transmits torque between a prime mover and drive wheels, and
wherein the controller is further configured to control a timing to start a shifting operation of the automatic transmission by executing the acceleration expediting control based on the predicted value of the position of the accelerator.

11. The vehicle control system as claimed in claim 1,
wherein a prime mover of the vehicle includes an engine having a supercharger, and
wherein the controller is further configured to control a timing to start supercharging of the supercharger by executing the acceleration expediting control based on the predicted value of the position of the accelerator.

12. The vehicle control system as claimed in claim 1,
wherein the vehicle includes a hybrid vehicle in which a prime mover includes an engine and a motor, and
wherein the controller is further configured to control a timing to start the engine by executing the acceleration expediting control based on the predicted value of the position of the accelerator.

* * * * *